June 14, 1927.
S. G. BREEDEN ET AL
1,632,535
BATTERY AND CONNECTER
Filed Aug. 2, 1926
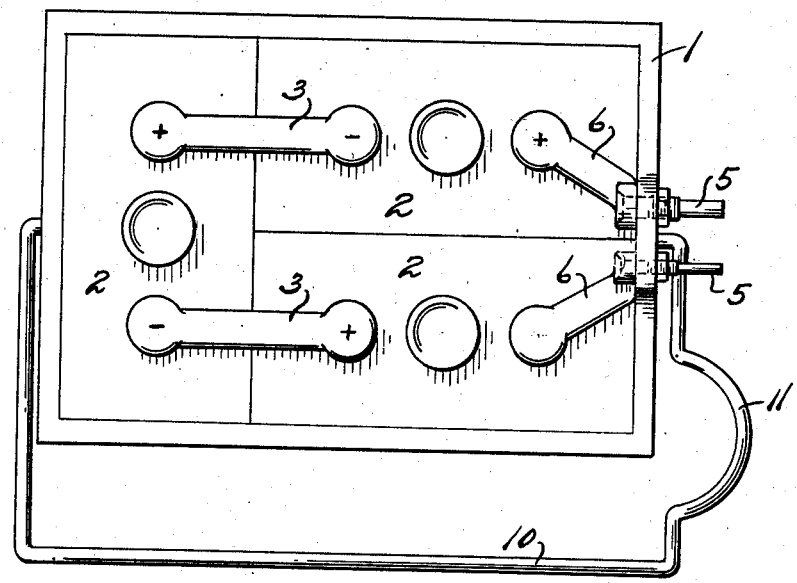
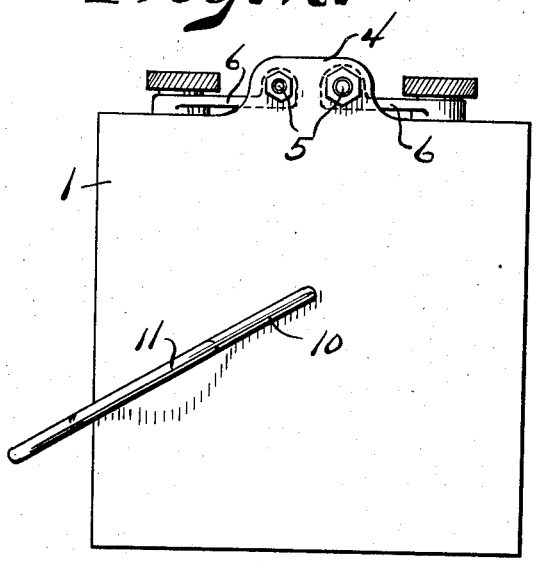
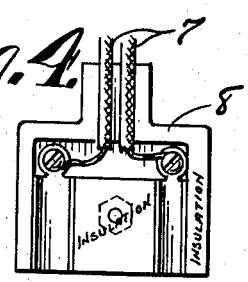
Sam G. Breeden and
Paul L. Breeden
INVENTOR
BY Victor J. Evans
ATTORNEY
WITNESS: John Donovan Patented June 14, 1927.

1,632,535

UNITED STATES PATENT OFFICE.

SAM G. BREEDEN AND PAUL L. BREEDEN, OF MEMPHIS, TENNESSEE.

BATTERY AND CONNECTER.

Application filed August 2, 1926. Serial No. 126,516.

This invention relates to improvements in a battery, the general object of the invention being to so form the battery that both the connections will be at one end thereof so as to facilitate the connection of the battery with an electric appliance.

A further object of the invention is to provide a socket plug for connecting the conductors with the terminals of the battery so that the connection can be made very easily and quickly.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 1 is a plan view of the improved battery.

Figure 2 is an end view thereof.

Figures 3 and 4 are views of the socket plug.

In these views, 1 indicates the battery box and 2 indicates the cells therein. Two of the cells are placed longitudinally in the box and in parallel relation, while the third cell extends transversely of the box, with one side abutting the ends of the other two cells. The transverse cell is connected with the other two cells by the usual connecter bars 3 so that the plus and minus terminals of the battery are located at the same end of the battery. This end of the box of the battery is provided with an extension 4 through which the terminals 5 pass. These terminals are connected by the connecters 6 with the plus and minus posts of the parallel cells of the battery. One terminal 5 is made larger than the other and the conductors 7 which lead to the appliance are connected with a socket plug 8, the sockets 9 in which are shaped to receive the projecting parts of the terminals 5, one socket being made larger than the other. Thus there is no danger of connecting the conductors to the wrong terminals, which might injure the appliance. The bail 10 of the battery is provided with a curved portion 11 so that it will not interfere with the terminals 5 when the bail is in use. The box is formed preferably of rubber or the like so that no insulation is needed for the terminals 5.

From the foregoing, it will be seen that we have provided a battery, the terminals of which are arranged at one end thereof so as to facilitate the connection of the battery with an appliance. The socket plug also facilitates the connection of the conductors with the battery and their disconnection therefrom. By making one terminal larger than the other, there is no danger of improperly connecting the battery with the appliance.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:—

A battery of the class described comprising a casing, a pair of cells in the casing arranged longitudinally thereof and parallel to each other, a third cell arranged transversely in the casing and having one side abutting the ends of the other two cells, bars connecting the cells together, a pair of terminals supported by one end of the casing and bars connecting the terminals with the plus and minus posts of the parallel cells.

In testimony whereof we affix our signatures.

SAM G. BREEDEN.
PAUL L. BREEDEN.